(12) United States Patent
Joo et al.

(10) Patent No.: US 12,173,860 B2
(45) Date of Patent: Dec. 24, 2024

(54) LIGHTING APPARATUS FOR VEHICLE

(71) Applicant: HYUNDAI MOBIS CO., LTD., Seoul (KR)

(72) Inventors: Chan Ho Joo, Yongin-si (KR); Do Hyung Kim, Yongin-si (KR); Ban Suk Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 18/220,516

(22) Filed: Jul. 11, 2023

(65) Prior Publication Data
US 2024/0019101 A1    Jan. 18, 2024

(30) Foreign Application Priority Data
Jul. 12, 2022 (KR) .......................... 10-2022-0085961

(51) Int. Cl.
*F21S 41/675* (2018.01)
*F21S 41/32* (2018.01)
*F21S 41/365* (2018.01)

(52) U.S. Cl.
CPC ............. *F21S 41/675* (2018.01); *F21S 41/32* (2018.01); *F21S 41/365* (2018.01)

(58) Field of Classification Search
CPC ........ F21S 41/675; F21S 41/32; F21S 41/365; F21W 2104/00; B60Q 2400/50; B60Q 1/50
See application file for complete search history.

(56) References Cited

U.S. PATENT DOCUMENTS

| 10,369,929 B2* | 8/2019 | Miyasaka | ............ B60Q 1/2669 |
| 2005/0094405 A1* | 5/2005 | Tatewaki | ................ G09F 13/02 362/341 |
| 2006/0114686 A1* | 6/2006 | Liu | ......................... B60R 13/04 362/509 |
| 2015/0156448 A1* | 6/2015 | Lee | ......................... G03B 21/14 348/745 |
| 2017/0297502 A1* | 10/2017 | Kim | ......................... B60R 19/48 |
| 2019/0080355 A1* | 3/2019 | Jiang | .................. G06Q 30/0265 |
| 2020/0294431 A1* | 9/2020 | Nakajima | ............... G09F 13/02 |
| 2022/0154909 A1* | 5/2022 | Tischler | ............... B60Q 1/2619 |

FOREIGN PATENT DOCUMENTS

KR  10-2015-0072578 A   6/2015
WO  WO-2023046275 A1 * 3/2023

* cited by examiner

*Primary Examiner* — Erin Kryukova
(74) *Attorney, Agent, or Firm* — Morgan, Lewis & Bockius LLP

(57) ABSTRACT

A lighting apparatus for a vehicle may include a lamp housing part mounted on a vehicle body, a projection optical system disposed within the lamp housing part and configured to radiate light, and a reflection part rotatably disposed in a light path of the light that is radiated by the projection optical system and configured to reflect, toward a lighting-up surface of the vehicle, the light that is radiated by the projection optical system.

18 Claims, 16 Drawing Sheets

LIGHTING APPARATUS FOR VEHICLE

CROSS-REFERENCE TO RELATED APPLICATION

This application claims the benefit of priority under 35 USC § 119(a) to Korean Patent Applications No. 10-2022-0085961, filed on Jul. 12, 2022, the entire disclosure of which is incorporated herein by reference for all purposes.

BACKGROUND

Field

Exemplary embodiments of the present disclosure relate to a lighting apparatus for a vehicle, and more particularly, to a lighting apparatus for a vehicle using a projection optical system.

Discussion of the Background

In general, a lamp for a vehicle is an apparatus for providing a driver with visual information by radiating road conditions and an obstacle in front of the vehicle during night driving so that the driver can check the road conditions and the obstacle or providing a signal to another road user.

In a conventional technology, a lamp for a vehicle uses a method of lighting-up the lamp by using a light-emitting diode (LED) direct-light or indirect-light lighting apparatus. In order to radiate light to a wide area, such as front green lighting, in addition to a head lamp and a rear lamp, there are problems in that costs for the vehicle and the volume of the vehicle are increased because many LEDs are required. Accordingly, there is a need for improving such problems.

The Background technology of the present disclosure is disclosed in Korean Patent Application Publication No. 10-2015-0072578 (published on Jun. 30, 2015 and entitled "GUIDE LAMP FOR VEHICLE").

SUMMARY

Various embodiments are directed to a lighting apparatus for a vehicle using a projection optical system.

In an embodiment, a lighting apparatus for a vehicle may include a lamp housing part mounted on a vehicle body, a projection optical system disposed within the lamp housing part and configured to radiate light, and a reflection part rotatably disposed in a light path of the light that is radiated by the projection optical system and configured to reflect, toward a lighting-up surface of the vehicle, the light that is radiated by the projection optical system.

A location of a lighting-up area on the lighting-up surface may be adjustable by a rotation manipulation of the reflection part.

The lighting apparatus may further include an outer lens part disposed in front of the light path of the light that is radiated by the projection optical system and configured to cover the reflection part.

The projection optical system may include a first projection optical system disposed on one side of the vehicle body and a second projection optical system disposed on the other side of the vehicle body. The reflection part may include a first reflection part disposed on one side of the vehicle body and configured to reflect the light of the first projection optical system so that a plurality of first lighting-up areas is implemented on the lighting-up surface and a second reflection part disposed on the other side of the vehicle body and configured to reflect the light of the first projection optical system so that a plurality of second lighting-up areas is implemented on the lighting-up surface. The lighting-up surface may be disposed between the first reflection part and the second reflection part.

Each of the first projection optical system and the second projection optical system may be provided in a plural number up and down. Each of the first reflection part and the second reflection part may be provided in a plural number up and down.

The plurality of first lighting-up areas may be able to be overlapped on the lighting-up surface by a rotation manipulation of the first reflection part. The plurality of second lighting-up areas may be able to be overlapped on the lighting-up surface by a rotation manipulation of the second reflection part.

The projection optical system may include the first projection optical system disposed on one side of the vehicle body and a second projection optical system disposed on the other side of the vehicle body. The reflection part may include a first reflection part disposed on one side of the vehicle body and configured to reflect the light of the first projection optical system so that a first lighting-up area is implemented on the lighting-up surface and a second reflection part disposed on the other side of the vehicle body and configured to reflect the light of the first projection optical system so that a second lighting-up area is implemented on the lighting-up surface. The first lighting-up area may be disposed under the first reflection part, and the second lighting-up area is disposed under the second reflection part.

Each of the first projection optical system and the second projection optical system may be provided in a plural number in the horizontal direction. Each of the first reflection part and the second reflection part may be provided in a plural number in the horizontal direction.

The plurality of first lighting-up areas may be able to be overlapped on the lighting-up surface by a rotation manipulation of the first reflection part. The plurality of second lighting-up areas may be able to be overlapped on the lighting-up surface by a rotation manipulation of the second reflection part.

The lighting apparatus for a vehicle may be a head lamp for a vehicle.

The lighting-up surface may be a front grill or a front bump.

The present disclosure can provide the lighting apparatus for a vehicle using the projection optical system.

The present disclosure can reduce manufacturing costs for a vehicle and the amount of power used in the vehicle and improve the degree of freedom of the design because the number of LEDs applied to the vehicle is reduced by implementing a lamp for a vehicle, grill lighting for a vehicle, or other various lighting devices by using the projection optical system.

The present disclosure can increase an added value of a head lamp because a front grill lighting solution and/or a front bump lighting solution can be implemented through the head lamp module.

The present disclosure can increase an added value of a rear lamp because a rear center lighting solution and/or a rear bumper lighting solution can be implemented through the rear lamp module.

According to the present disclosure, a light radiation distance from the projection optical system to a light radiation surface is increased by the reflection part because light that is radiated by the projection optical system reaches the light radiation surface via the reflection part. Accordingly, a wider lighting-up area on a lighting-up surface of a vehicle can be secured.

According to the present disclosure, the projection optical system can be disposed more closely to a lighting-up surface of a vehicle because the light radiation distance from the projection optical system to a light radiation surface can be increased through the reflection part.

The present disclosure can implement various lighting-up images by increasing or decreasing an overlap area between a plurality of lighting-up areas by rotating and operating the reflection part.

The present disclosure can provide customizing lighting that is optimized for a use environment or a user because a lighting-up area can be adjusted by only a rotation manipulation of the reflection part even without adjusting the location of the projection optical system.

DETAILED DESCRIPTION OF THE ILLUSTRATED EMBODIMENTS

Figure 1:
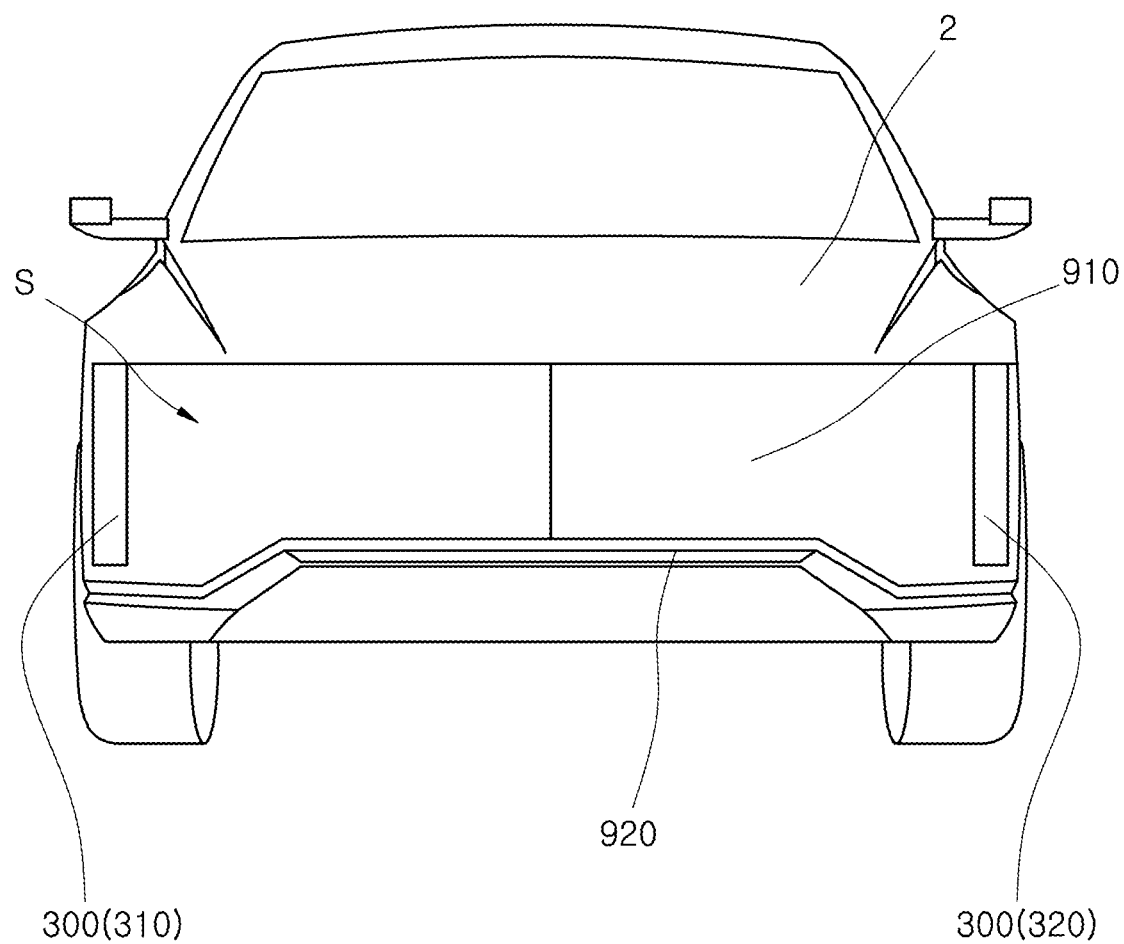
FIG. 1 is a diagram of a vehicle according to an embodiment of the present disclosure, which is seen from the front thereof.

Hereinafter, a lighting apparatus for a vehicle will be described below with reference to the accompanying drawings through various exemplary embodiments. In such a process, the thickness of a line or the size of an element illustrated in the drawings may have been exaggerated for the clarity of a description and for convenience' sake. Terms to be described below have been defined by taking into consideration their functions in the present disclosure, and may be different depending on a user or operator's intention or practice. Accordingly, such terms should be interpreted based on the overall contents of this specification.

Figure 2:
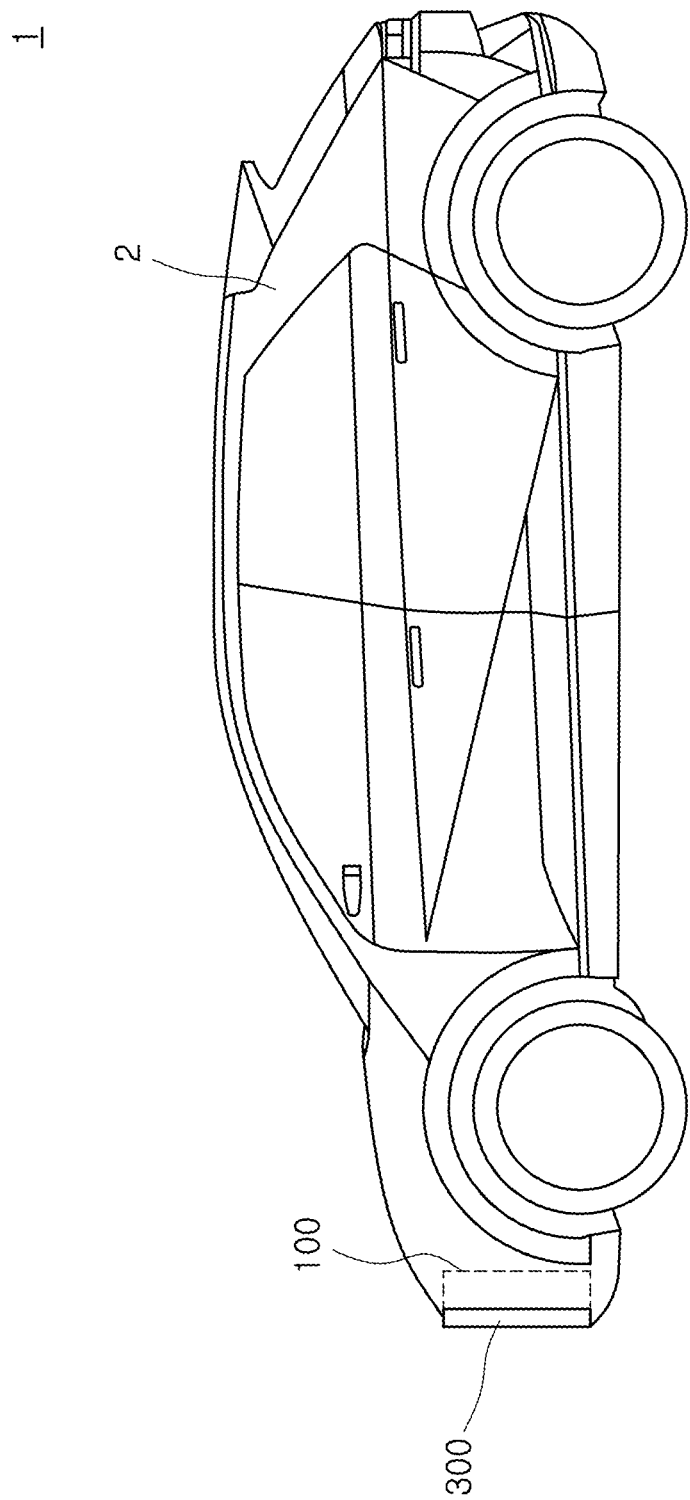
FIG. 2 is a diagram of the vehicle according to an embodiment of the present disclosure, which is seen from a side thereof.
Figure 3:
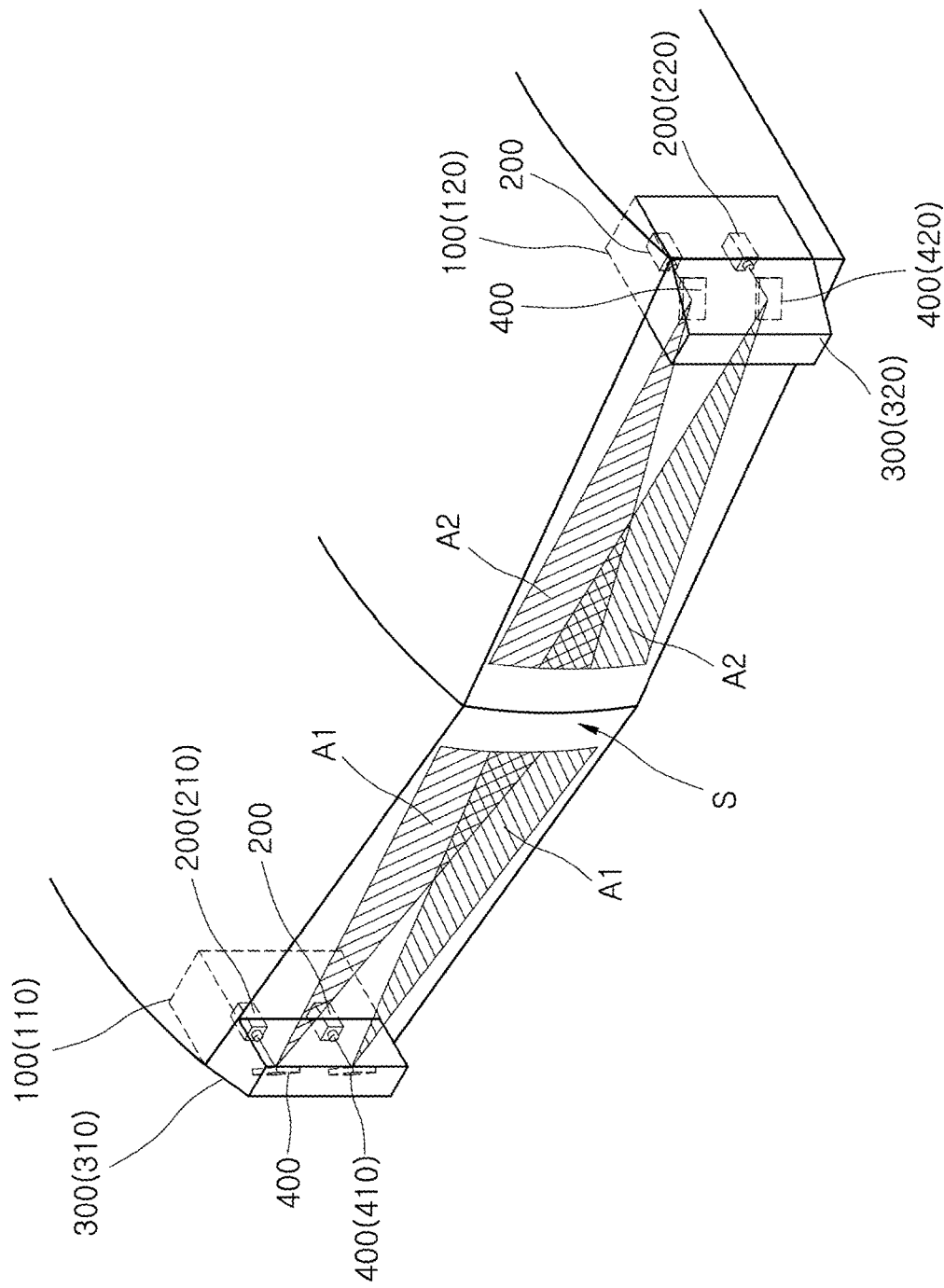
FIG. 3 is a perspective view illustrating a lighting apparatus for a vehicle according to an embodiment of the present disclosure.
Figure 4:
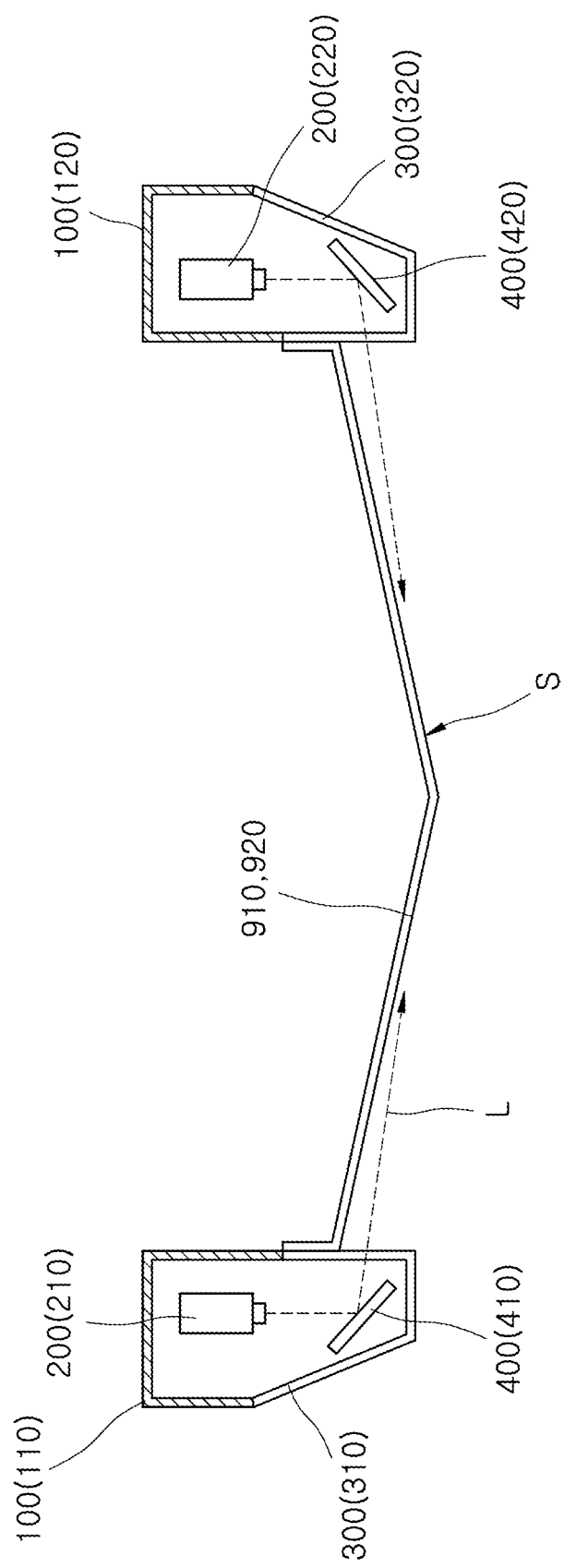
FIG. 4 is a plan view illustrating the lighting apparatus for a vehicle according to an embodiment of the present disclosure.
Figure 5:
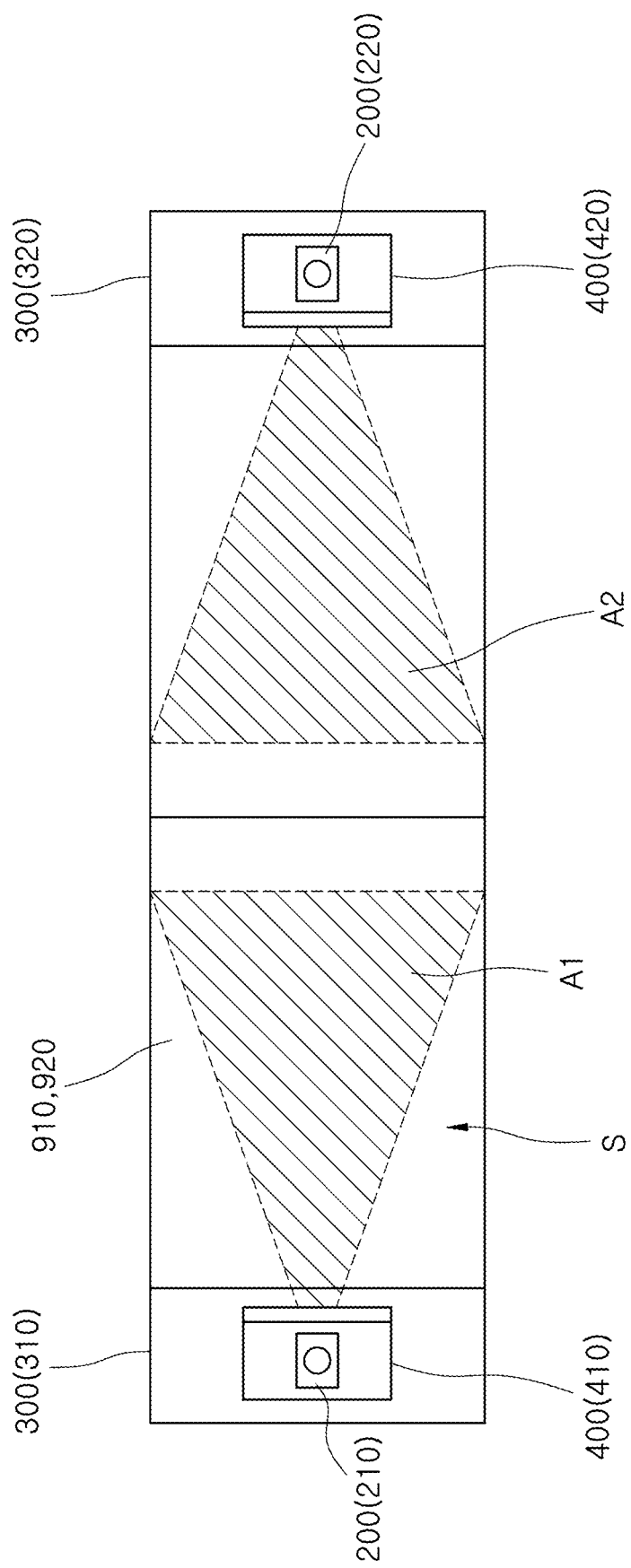
FIG. 5 is a front view illustrating the lighting apparatus for a vehicle according to an embodiment of the present disclosure.
Figure 6:
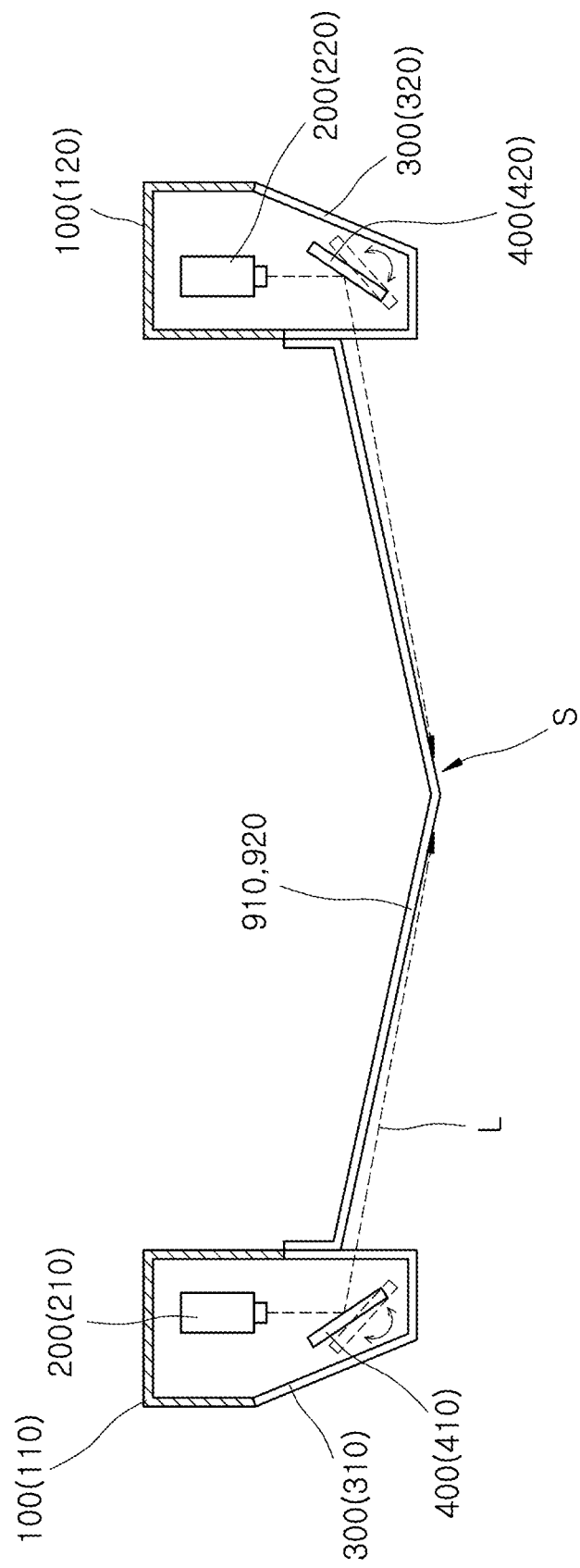
FIG. 6 is a plan view illustrating a modified example of the lighting apparatus for a vehicle according to an embodiment of the present disclosure.
Figure 7:
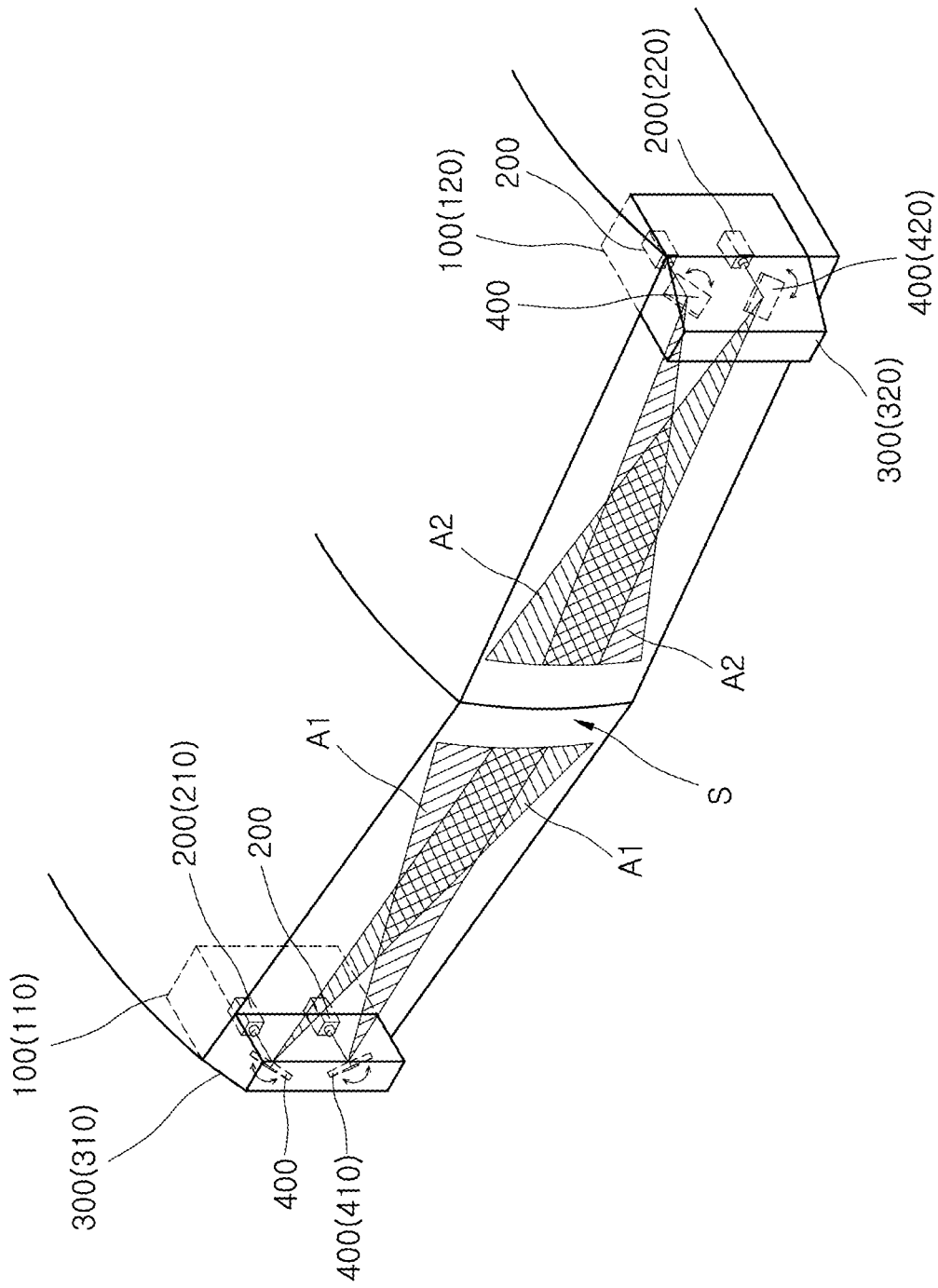
FIG. 7 is a perspective view illustrating a modified example of the lighting apparatus for a vehicle according to an embodiment of the present disclosure.

FIG. 1 is a diagram of a vehicle according to an embodiment of the present disclosure, which is seen from the front thereof. FIG. 2 is a diagram of the vehicle according to an embodiment of the present disclosure, which is seen from a side thereof. FIG. 3 is a perspective view illustrating a lighting apparatus for a vehicle according to an embodiment of the present disclosure. FIG. 4 is a plan view illustrating the lighting apparatus for a vehicle according to an embodiment of the present disclosure. FIG. 5 is a front view illustrating the lighting apparatus for a vehicle according to an embodiment of the present disclosure. FIG. 6 is a plan view illustrating a modified example of the lighting apparatus for a vehicle according to an embodiment of the present disclosure. FIG. 7 is a perspective view illustrating a modified example of the lighting apparatus for a vehicle according to an embodiment of the present disclosure.

Referring to FIGS. 1 to 5, the lighting apparatus for a vehicle according to an embodiment of the present disclosure includes a lamp housing part 100, a projection optical system 200, an outer lens part 300, and a reflection part 400.

The lamp housing part 100 is mounted on a vehicle body 2. The lamp housing part 100 surrounds the projection optical system 200. An opening (a reference numeral thereof not illustrated) is formed at the front of the lamp housing part 100 so that light that is radiated by the projection optical system 200 is discharged to the outside.

The outer lens part 300 may be mounted on the lamp housing part 100. The outer lens part 300 covers the front of the lamp housing part 100 by closing the opening of the lamp housing part 100.

The projection optical system 200 radiates light, and is disposed within the lamp housing part 100. The lamp housing part 100 may include a discharge hole part (not illustrated) for discharging, to the outside, heat that is generated when the projection optical system 200 operates.

The lighting apparatus for a vehicle includes a cooling fan part (not illustrated). The cooling fan part is mounted on the lamp housing part 100, and cools heat that is discharged from the projection optical system 200.

The projection optical system 200 may be fixed within the lamp housing part 100 by a support (not illustrated).

In the present embodiment, the lamp housing part 100 includes a first lamp housing part 110 and a second lamp housing part 120.

The first lamp housing part 110 is disposed on the left side of the vehicle 1 (i.e., the left side of FIG. 3) when viewed from the front of the vehicle 1. The second lamp housing part 120 is disposed on the right side of the vehicle 1 (i.e., the right side of FIG. 3) when viewed from the front of the vehicle 1. The first lamp housing part 110 and the second lamp housing part 120 may be symmetrically formed on the basis of the center of the vehicle.

The projection optical system 200 is disposed within the lamp housing part 100, and radiates light L. The projection optical system 200 may be formed of various light sources capable of projection, such as an LED light source and a laser light source.

In the present embodiment, the projection optical system 200 includes a first projection optical system 210 and a second projection optical system 220.

The first projection optical system 210 is disposed on one side of the vehicle 1 and disposed within the first lamp housing part 110, and radiates the light L. The first projection optical system 210 may include a mask (not illustrated) and radiate patterned light.

The first projection optical system 210 radiates the light L toward a first reflection part 410. The light L that is radiated by the first projection optical system 210 is reflected by the first reflection part 410, and reaches a lighting-up surface S of the vehicle 1. Accordingly, an image of the light L may be formed in a lighting-up area A1 within the lighting-up surface S.

The light L that is radiated by the first projection optical system 210 may be light that has been patterned in a line form, and may be light that has been patterned in another form. The light L that is radiated by the first projection optical system 210 may be light that has not been patterned.

The first projection optical system 210 may be provided in a plural number up and down, that is, in the height direction of the vehicle 1. Pieces of light L that are radiated by the first projection optical systems 210, respectively, may implement a plurality of images while forming different light paths.

The second projection optical system 220 is disposed on the other side of the vehicle 1 and disposed within the second lamp housing part 120, and radiates the light L. The second projection optical system 220 may include a mask and radiate patterned light.

The second projection optical system 220 radiates the light L toward a second reflection part 420. The light L that is radiated by the second projection optical system 220 is reflected by the second reflection part 420, and reaches the lighting-up surface S of the vehicle 1. Accordingly, an image of the light L may be formed in a lighting-up area A2 within the lighting-up surface S.

The light L that is radiated by the second projection optical system 220 may be light that has been patterned in a line form, and may be light that has been patterned in another form. The light L that is radiated by the second projection optical system 220 may be light that has not been patterned.

The second projection optical system 220 may be provided in a plural number up and down, that is, in the height direction of the vehicle 1. Pieces of light L that are radiated by the second projection optical system 220, respectively, may implement a plurality of images while forming different light paths.

The outer lens part 300 may be coupled to the lamp housing part 100. The outer lens part 300 may be connected to the lamp housing part 100 while being combined with the vehicle body 2.

The outer lens part 300 is disposed in front of the light path of the light L that is radiated by the projection optical system 200, and covers the reflection part 400.

The outer lens part 300 includes a light-transmissive translucent material. Accordingly, when light is not radiated by the projection optical system 200, the projection optical system 200 and the reflection part 400 are not seen from the outside by the outer lens part 300 made of the translucent material.

The outer lens part 300 includes a first outer lens part 310 that is disposed on one side of the vehicle 1 and a second outer lens part 320 that is disposed on the other side of the vehicle 1. The first outer lens part 310 and the second outer lens part 320 may be symmetrically formed on the basis of the center of the vehicle.

The reflection part 400 is disposed in the light path of the light L that is radiated by the projection optical system 200. The light L that is radiated by the projection optical system 200 is reflected toward the lighting-up surface S of the vehicle by the reflection part 400. Accordingly, an image of the light L that is radiated by the projection optical system 200 can be formed on the lighting-up surface S of the vehicle.

In the present embodiment, the reflection part 400 includes the first reflection part 410 and the second reflection part 420.

The first reflection part 410 is disposed on one side of the vehicle 1, and reflects, toward the lighting-up surface S, the light L that is radiated by the first projection optical system 210.

If the first projection optical system 210 is provided in a plural number up and down, the first reflection part 410 may also be provided in a plural number up and down, that is, in the height direction of the vehicle 1. Accordingly, pieces of the light L that are radiated by the first projection optical systems 210, respectively, are directed toward the lighting-up surface S while being individually reflected by the corresponding first reflection parts 410.

The second reflection part 420 is disposed on the other side of the vehicle 1, and reflects, toward the lighting-up surface S, the light L that is radiated by the second projection optical system 220.

If the second projection optical system 220 is provided in a plural number up and down, the second reflection part 420 may also be provided in a plural number up and down, that is, in the height direction of the vehicle 1. Accordingly, pieces of the light L that are radiated by the second projection optical systems 220, respectively, are directed toward the lighting-up surface S while being individually reflected by the corresponding second reflection parts 420.

The lighting-up surface S is disposed between the first reflection part 410 and the second reflection part 420. In the present embodiment, the lighting-up surface S may be a front grill 910 or a front bump 920.

Grill lighting can be implemented in the front grill 910 because the pieces of light L that are reflected by the first reflection part 410 and the second reflection part 420, respectively, form an image on the front grill 910.

The grill lighting that is implemented by the lighting apparatus for a vehicle according to an embodiment of the present disclosure may be welcome lighting, goodbye lighting, position lighting, or deco lighting. Furthermore, the grill lighting may implement lighting that displays various types of information, such as an electric charging information display lamp and an autonomous driving information display lamp Likewise, bumper lighting can be implemented in the front bump 920 because pieces of the light L that are reflected by the first reflection part 410 and the second reflection part 420, respectively, can form an image on the front bump 920.

The bumper lighting that is implemented by the lighting apparatus for a vehicle according to an embodiment of the present disclosure may be welcome lighting, goodbye lighting, position lighting, or deco lighting. Furthermore, the bumper lighting may implement lighting that displays various types of information, such as an electric charging information display lamp and an autonomous driving information display lamp.

The lighting apparatus for a vehicle according to an embodiment of the present disclosure may be a lamp for a vehicle, including a head lamp, a rear lamp, a tail lamp, a turn signal lamp, a brake lamp, a backup lamp, a daytime running map, and a fog lamp for the vehicle 1. Accordingly, the lamp housing part 100 may be mounted in any one of a head lamp area, a rear lamp area, a tail lamp area, a turn signal lamp area, and a brake lamp area.

If the lighting apparatus for a vehicle forms a head lamp for the vehicle 1, the lamp housing part 100 may be a head lamp housing. If a head lamp module of the vehicle 1 is implemented by using the lighting apparatus for a vehicle according to the present embodiment, the head lamp module may provide a front grill lighting solution and a front bump lighting solution in addition to a head lamp function.

If the lighting apparatus for a vehicle forms a rear lamp for the vehicle 1, the lamp housing part 100 may be a rear lamp housing. If the rear lamp module of the vehicle 1 is implemented as the lighting apparatus for a vehicle according to the present embodiment, a rear lamp module may provide a rear center lighting solution and a rear bumper lighting solution in addition to a rear lamp function.

Referring to FIGS. 6 and 7, in the modified example of the lighting apparatus for a vehicle according to an embodiment of the present disclosure, the reflection part 400 may be rotatably disposed in the light path of the light L that is radiated by the projection optical system 200.

The light L that is radiated by the projection optical system 200 is reflected toward the lighting-up surface S of the vehicle by the reflection part 400. In this case, as the reflection part 400 is rotated and manipulated, the locations of the lighting-up areas A1 and A2 on the lighting-up surface S of the vehicle 1 may be adjusted.

The reflection part 400 may be rotatably disposed within the outer lens part 300 while being supported by the vehicle body 2 or peripheral parts. Any object that supports the reflection part 400 is not limited if the reflection part 400 can be rotatably disposed within the outer lens part 300 by the object.

In the present embodiment, the reflection part 400 includes the first reflection part 410 and the second reflection part 420.

The first reflection part 410 is disposed on one side of the vehicle 1, and reflects, toward the lighting-up surface S, the light L that is radiated by the first projection optical system 210. Accordingly, the first reflection part 410 implements the first lighting-up area A1 on the lighting-up surface S.

If the first projection optical system 210 is provided in a plural number up and down, the first reflection part 410 may also be provided in a plural number up and down, that is, in the height direction of the vehicle 1. Accordingly, pieces of the light L that are radiated by the first projection optical systems 210, respectively, are directed toward the lighting-up surface S while being individually reflected by the corresponding first reflection parts 410.

Since the first reflection part 410 is rotatably mounted within the outer lens part 300, the first projection optical system 210 can form an image on the lighting-up surface S along more various light paths through the rotation of the first reflection part 410.

Referring to FIG. 7, the first lighting-up area A1 in which an image is formed as the light paths of the light L that is radiated by the first projection optical system 210 are intersected is formed on the lighting-up surface S. A brighter image is formed in the area in which the light paths are intersected, compared to an area in which the light paths are not intersected.

As the first reflection part 410 is rotatably mounted, the area in which the light paths are intersected, that is, an overlap area of the first lighting-up area A1 to which the light L is radiated on the lighting-up surface S, can be further increased or reduced by a rotation operation of the first reflection part 410. Accordingly, various light patterns can be implemented through the lighting apparatus for a vehicle.

The second reflection part 420 is disposed on the other side of the vehicle 1, and reflects, toward the lighting-up surface S, the light L that is radiated by the second projection optical system 220. Accordingly, the second reflection part 420 implements the second lighting-up area A2 on the lighting-up surface S.

If the second projection optical system 220 is provided in a plural number up and down, the second reflection part 420 may also be provided in a plural number up and down, that is, in the height direction of the vehicle 1. Accordingly, pieces of the light L that are radiated by the second projection optical systems 220, respectively, are directed toward the lighting-up surface S while being individually reflected by the corresponding second reflection parts 420.

Since the second reflection part 420 is rotatably mounted within the outer lens part 300, the second projection optical system 220 can form an image on the lighting-up surface S along more various light paths through the rotation of the second reflection part 420.

Referring to FIG. 7, the second lighting-up area A2 in which an image is formed as the light paths of the light L that is radiated by the second projection optical system 220 are intersected is formed on the lighting-up surface S. A brighter image is formed in the area in which the light paths are intersected, compared to an area in which the light paths are not intersected.

As the second reflection part 420 is rotatably mounted, the area in which light paths are intersected, that is, an overlap area of the second lighting-up area A2 to which the light L is radiated in the lighting-up surface S, can be further increased or reduced by a rotation operation of the second reflection part 420. Accordingly, various light patterns can be implemented through the lighting apparatus for a vehicle.

The lighting-up surface S is disposed between the first reflection part 410 and the second reflection part 420. In the present embodiment, the lighting-up surface S may be the front grill 910 or the front bump 920.

Grill lighting can be implemented in the front grill 910 because the pieces of light L that are reflected by the first reflection part 410 and the second reflection part 420, respectively, form an image on the front grill 910.

The grill lighting that is implemented by the lighting apparatus for a vehicle according to an embodiment of the present disclosure may be welcome lighting, goodbye lighting, position lighting, or deco lighting. Furthermore, the grill lighting can implement lighting that displays various types of information, such as an electric charging information display lamp and an autonomous driving information display lamp.

Likewise, bumper lighting can be implemented in the front bump 920 because the pieces of light L that are reflected by the first reflection part 410 and the second reflection part 420, respectively, can form an image in the front bump 920.

In particular, by rotating and operating the first reflection part 410 and the second reflection part 420, various lighting-up images can be implemented while increasing or reducing the overlap area of the plurality of first lighting-up areas A1 and second lighting-up areas A2.

Accordingly, customizing lighting that is optimized for a use environment or a user can be provided because the lighting-up areas A1 and A2 can be adjusted by only rotation manipulations of the first reflection part 410 and the second reflection part 420 even without adjusting the locations of the first projection optical system 210 and the second projection optical system 220.

Figure 8:
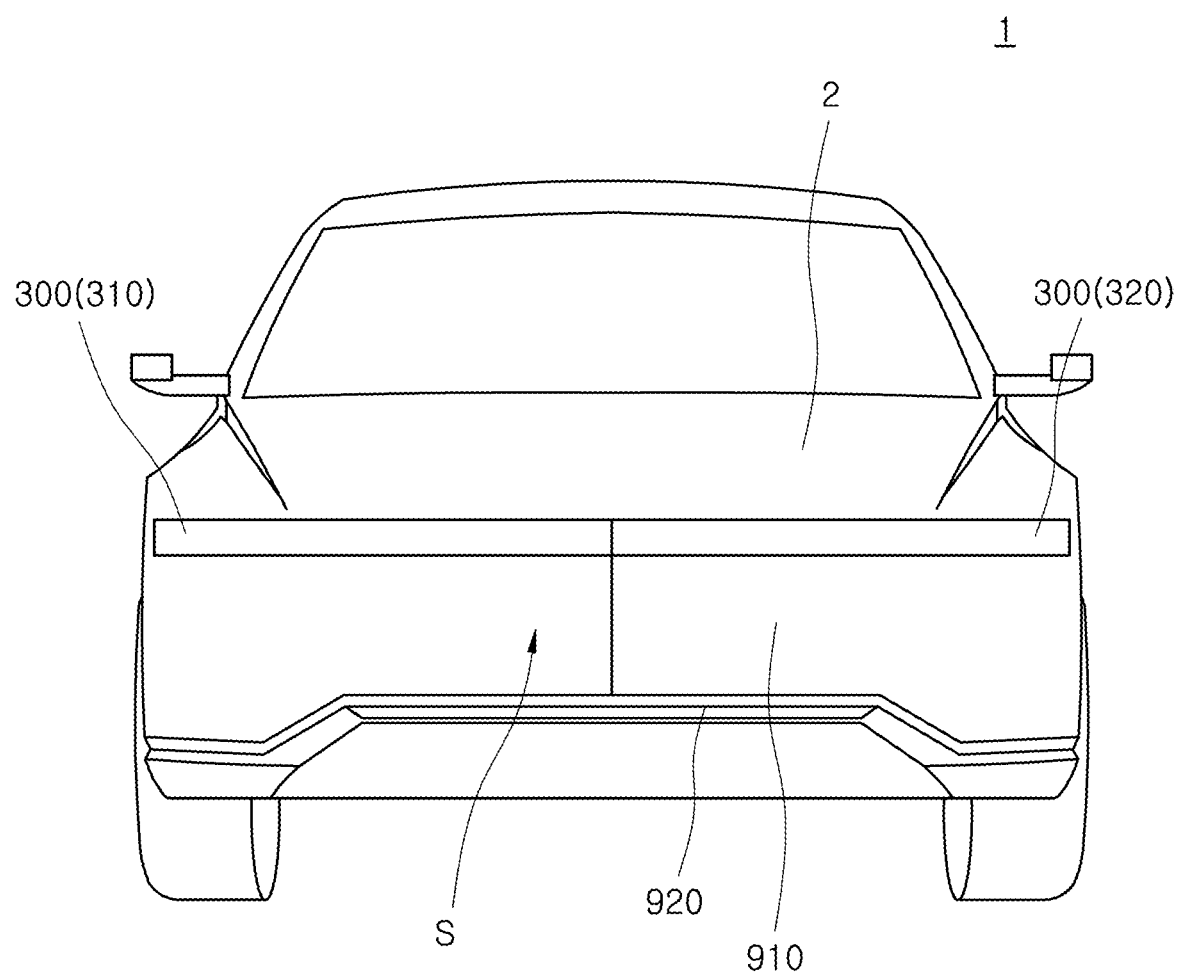
FIG. 8 is a diagram of a vehicle according to another embodiment of the present disclosure, which is seen from the front thereof.
Figure 9:
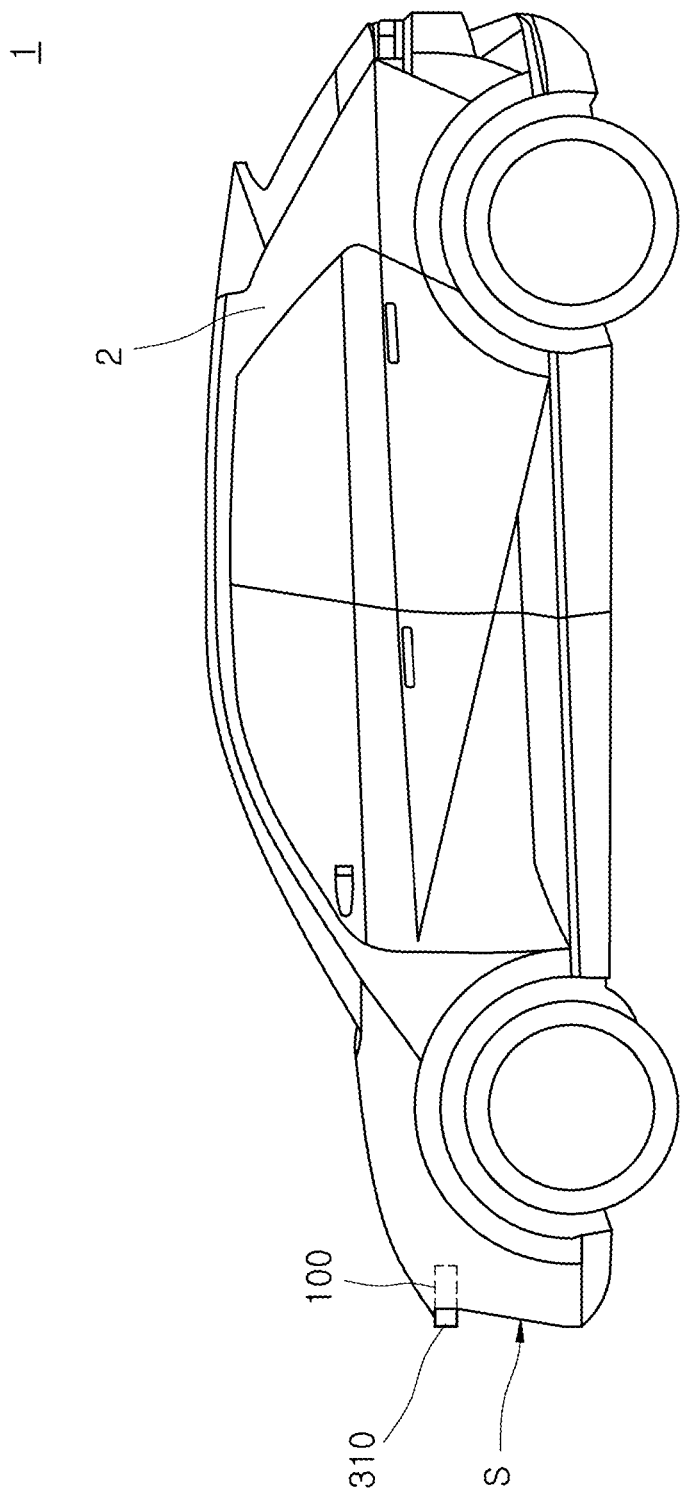
FIG. 9 is a diagram of the vehicle according to another embodiment of the present disclosure, which is seen from a side thereof.
Figure 10:
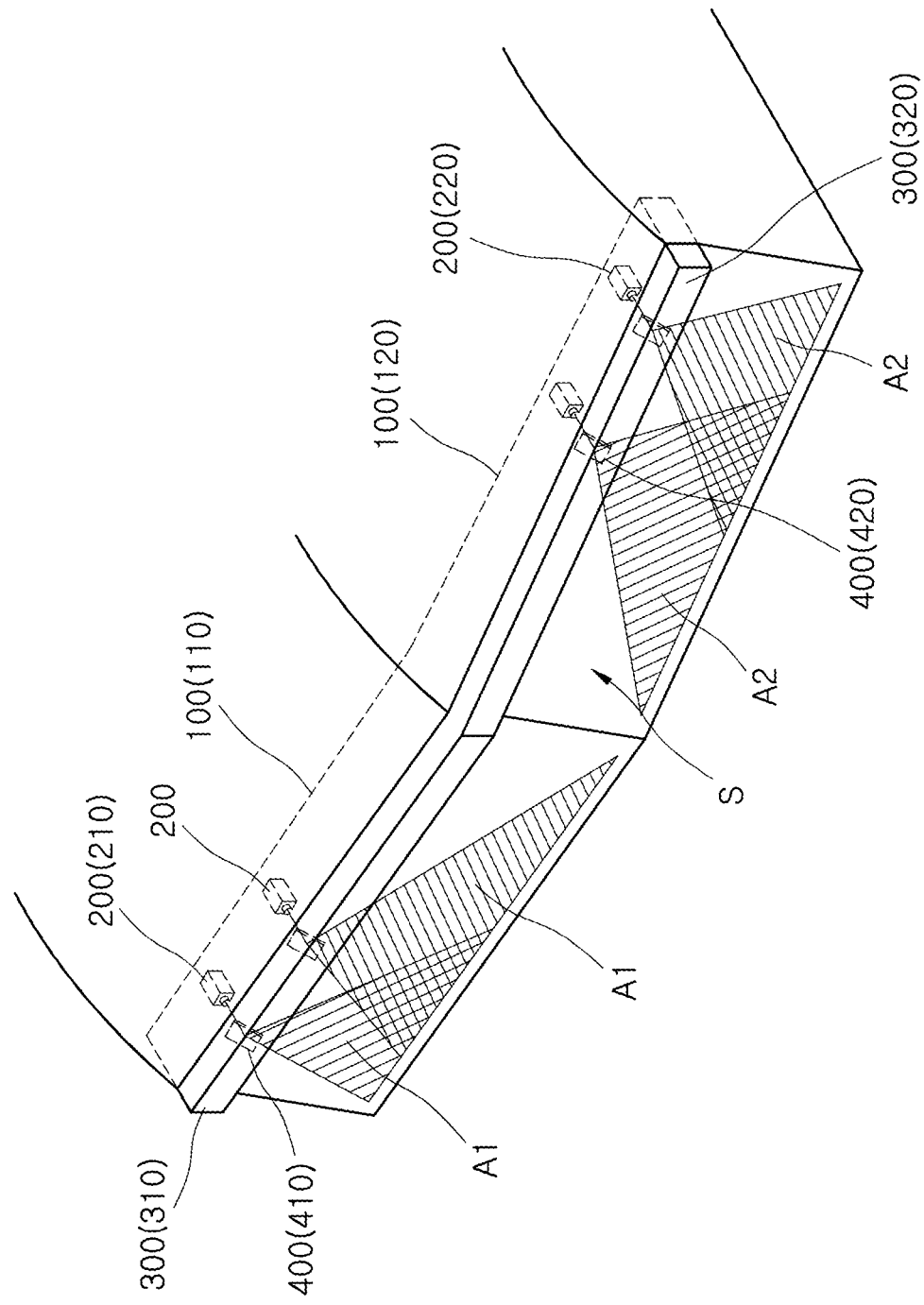
FIG. 10 is a perspective view illustrating a lighting apparatus for a vehicle according to another embodiment of the present disclosure.
Figure 11:
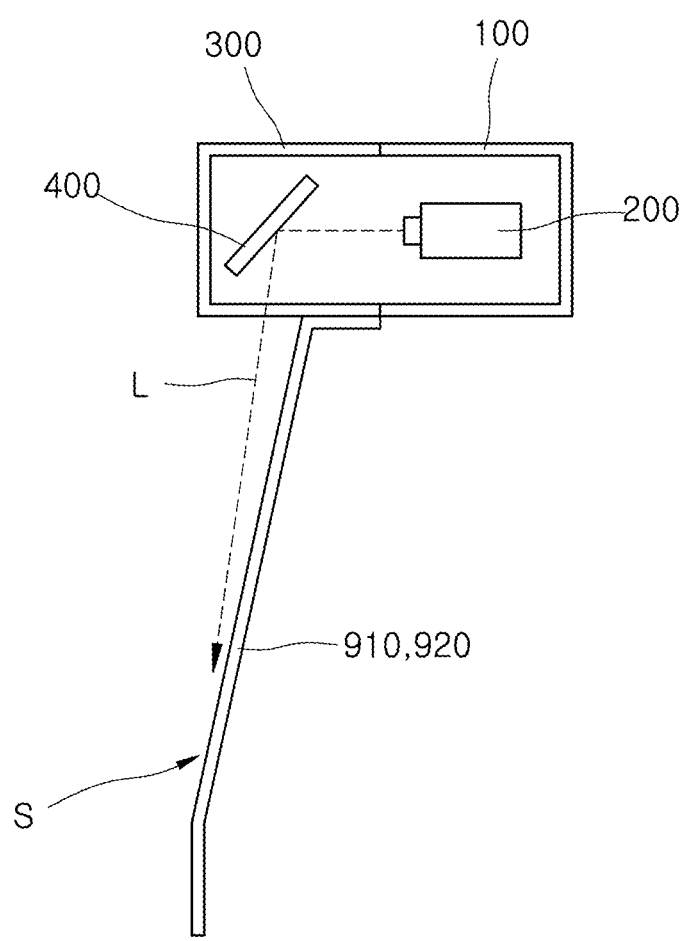
FIG. 11 is a side view illustrating the lighting apparatus for a vehicle according to another embodiment of the present disclosure.
Figure 12:
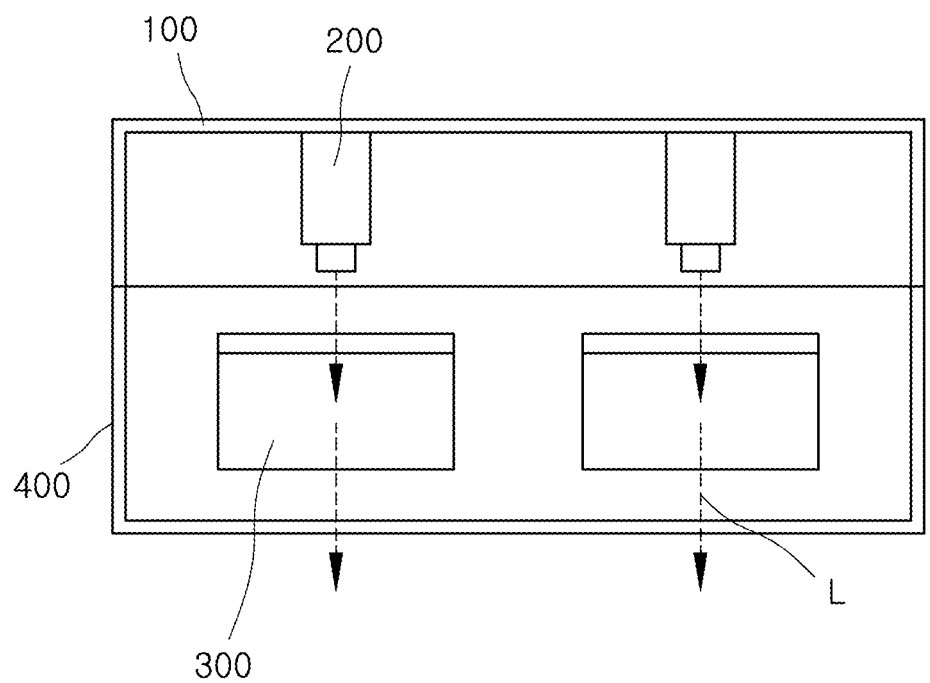
FIG. 12 is a plan view illustrating the lighting apparatus for a vehicle according to another embodiment of the present disclosure.
Figure 13:
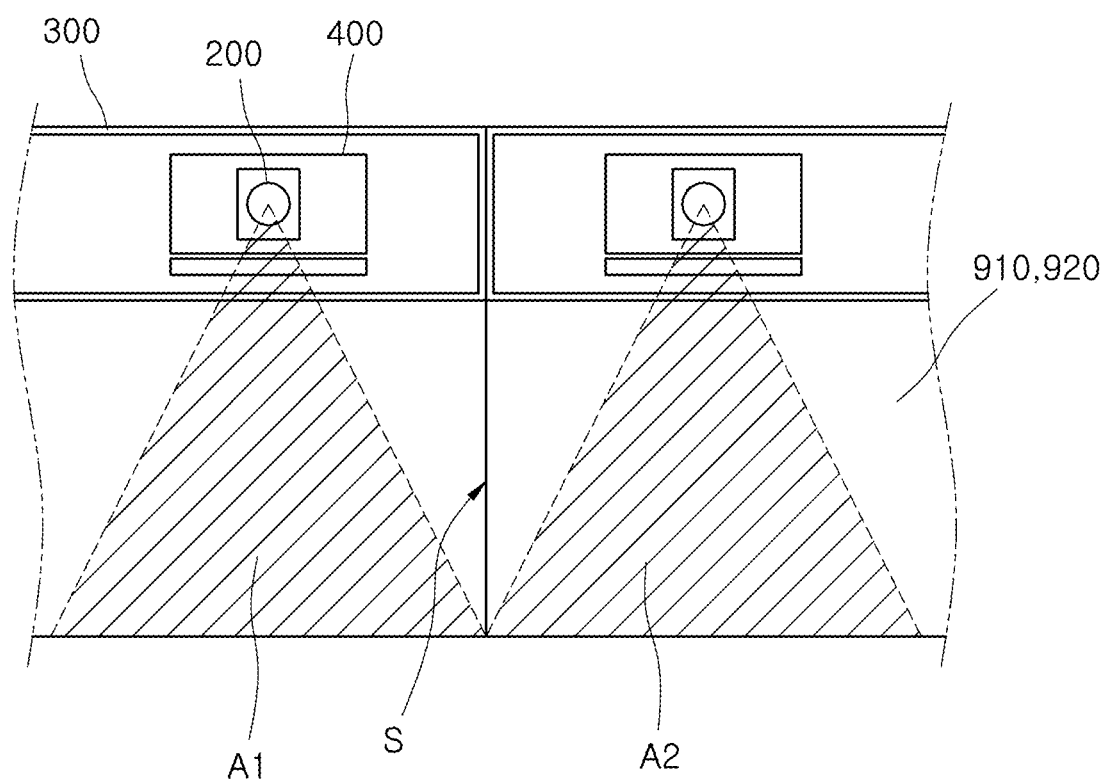
FIG. 13 is a front view illustrating the lighting apparatus for a vehicle according to another embodiment of the present disclosure.
Figure 14:
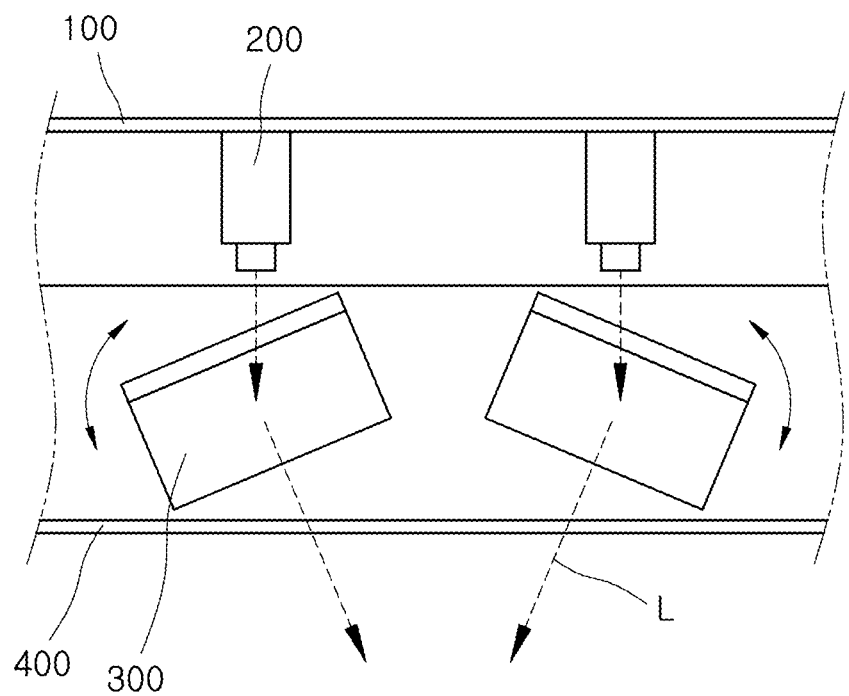
FIG. 14 is a plan view illustrating a modified example of the lighting apparatus for a vehicle according to another embodiment of the present disclosure.
Figure 15:
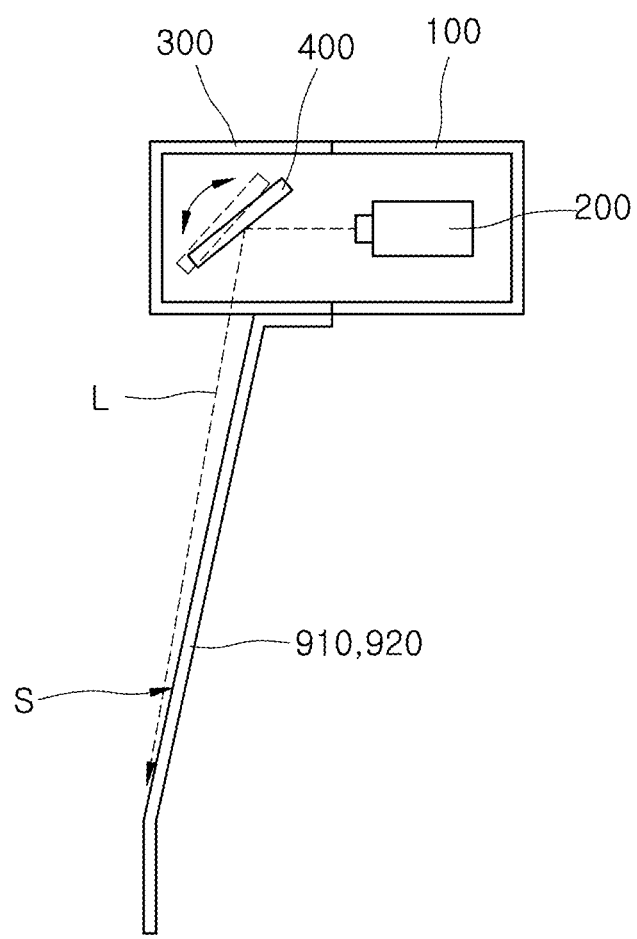
FIG. 15 is a side view illustrating a modified example of the lighting apparatus for a vehicle according to another embodiment of the present disclosure.
Figure 16:
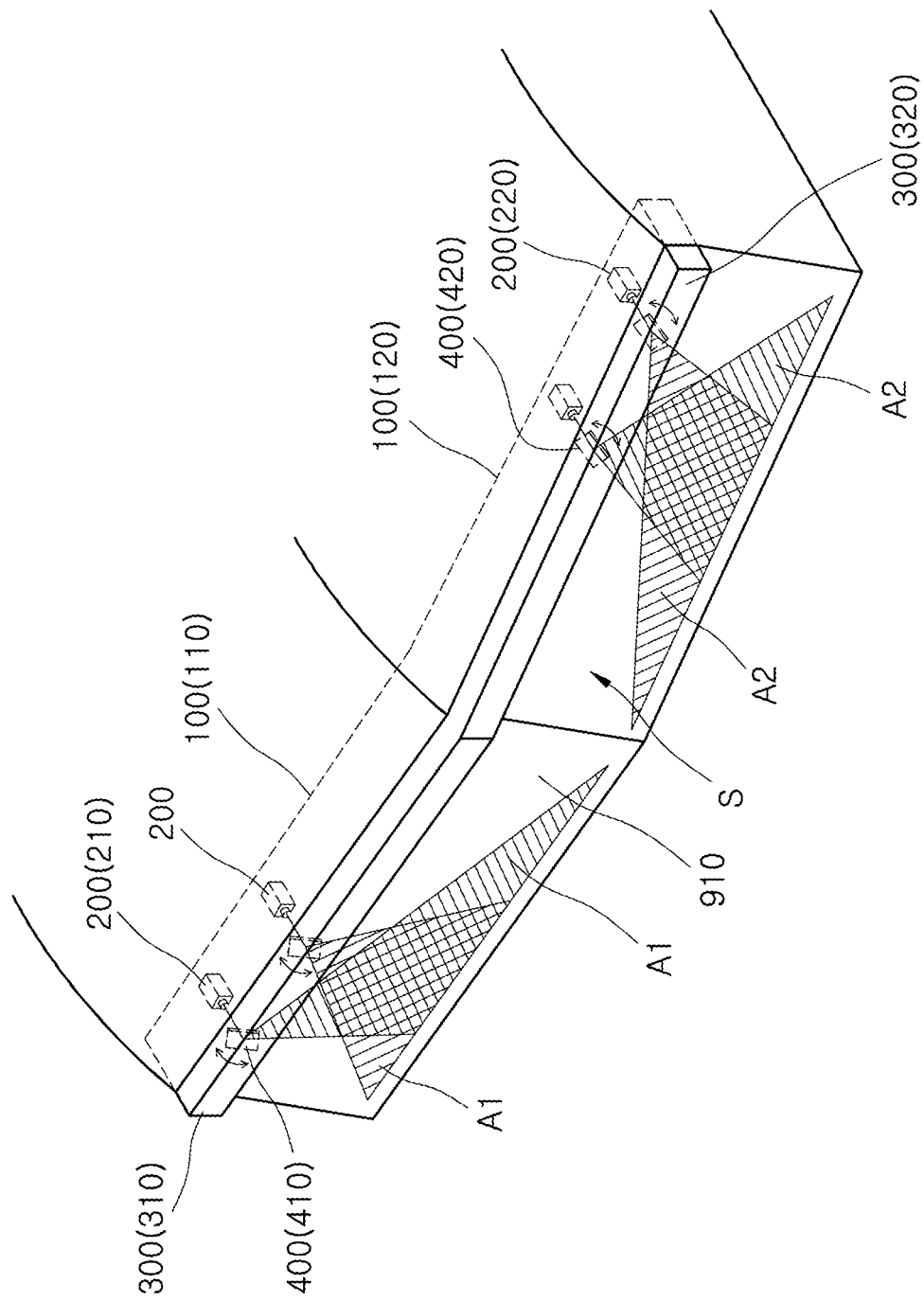
FIG. 16 is a perspective view illustrating a modified example of the lighting apparatus for a vehicle according to another embodiment of the present disclosure.

FIG. 8 is a diagram of a vehicle according to another embodiment of the present disclosure, which is seen from the front thereof. FIG. 9 is a diagram of the vehicle according to another embodiment of the present disclosure, which is seen from a side thereof. FIG. 10 is a perspective view illustrating a lighting apparatus for a vehicle according to another embodiment of the present disclosure. FIG. 11 is a side view illustrating the lighting apparatus for a vehicle according to another embodiment of the present disclosure. FIG. 12 is a plan view illustrating the lighting apparatus for a vehicle according to another embodiment of the present disclosure. FIG. 13 is a front view illustrating the lighting apparatus for a vehicle according to another embodiment of the present disclosure. FIG. 14 is a plan view illustrating a modified example of the lighting apparatus for a vehicle according to another embodiment of the present disclosure. FIG. 15 is a side view illustrating a modified example of the lighting apparatus for a vehicle according to another embodiment of the present disclosure. FIG. 16 is a perspective view illustrating a modified example of the lighting apparatus for a vehicle according to another embodiment of the present disclosure.

Referring to FIGS. 8 to 13, the lighting apparatus for a vehicle according to another embodiment of the present disclosure includes a lamp housing part 100, a projection optical system 200, an outer lens part 300, and a reflection part 400.

The lamp housing part 100 is mounted on a vehicle body 2. The lamp housing part 100 surrounds the projection optical system 200. An opening (a reference numeral thereof not illustrated) is formed at the front of the lamp housing part 100 so that light that is radiated by the projection optical system 200 is discharged to the outside.

The outer lens part 300 may be mounted on the lamp housing part 100. The outer lens part 300 covers the front of the lamp housing part 100 by closing the opening of the lamp housing part 100.

The projection optical system 200 radiates light, and is disposed within the lamp housing part 100. The lamp housing part 100 may include a discharge hole part (not illustrated) for discharging, to the outside, heat that is generated when the projection optical system 200 operates.

The lighting apparatus for a vehicle includes a cooling fan part (not illustrated). The cooling fan part is mounted on the lamp housing part 100, and cools heat that is discharged by the projection optical system 200.

The projection optical system 200 may be fixed within the lamp housing part 100 by a support (not illustrated).

In the present embodiment, the lamp housing part 100 includes a first lamp housing part 110 and a second lamp housing part 120.

The first lamp housing part 110 is disposed on the left side of the vehicle 1 (i.e., the left side of FIG. 10) when viewed from the front of the vehicle 1. The second lamp housing part 120 is disposed on the right side of the vehicle 1 (i.e., the right side of FIG. 10) when viewed from the front of the vehicle 1. The first lamp housing part 110 and the second lamp housing part 120 may be symmetrically formed on the basis of the center of the vehicle.

The projection optical system 200 is disposed within the lamp housing part 100, and radiates light L. The projection optical system 200 may be formed of various light sources capable of projection, such as an LED light source and a laser light source.

In the present embodiment, the projection optical system 200 includes a first projection optical system 210 and a second projection optical system 220.

The first projection optical system 210 is disposed within the first lamp housing part 110 that is disposed on one side of the vehicle 1. The first projection optical system 210 may include a mask (not illustrated) and radiate patterned light.

The first projection optical system 210 radiates the light L toward a first reflection part 410. The light L that is radiated by the first projection optical system 210 is reflected by the first reflection part 410, and reaches a lighting-up surface S of the vehicle 1. Accordingly, an image of the light L may be formed in a lighting-up area A1 within the lighting-up surface S.

The light L that is radiated by the first projection optical system 210 may be light that has been patterned in a line form, and may be light that has been patterned in another form. The light L that is radiated by the first projection optical system 210 may be light that has not been patterned.

The first projection optical system 210 may be provided in a plural number in the horizontal direction, that is, in the width direction of the vehicle 1. Pieces of the light L that are radiated by the first projection optical systems 210, respectively, can implement a plurality of images while forming different light paths.

The second projection optical system 220 is disposed within the second lamp housing part 120 that is disposed on the other side of the vehicle 1, and radiates the light L. The second projection optical system 220 may include a mask (not illustrated) and radiate patterned light.

The second projection optical system 220 radiates the light L toward a second reflection part 420. The light L that is radiated by the second projection optical system 220 is reflected by the second reflection part 420, and reaches the lighting-up surface S of the vehicle 1. Accordingly, an image of the light L may be formed in a lighting-up area A2 within the lighting-up surface S.

The light L that is radiated by the second projection optical system 220 may be light that has been patterned in a line form, and may be light that has been patterned in another form. The light L that is radiated by the second projection optical system 220 may be light that has not been patterned.

The second projection optical system 220 may be provided in a plural number in the horizontal direction, that is, in the width direction of the vehicle 1. Pieces of the light L that are radiated by the second projection optical systems 220, respectively, can implement a plurality of images while forming different light paths.

The outer lens part 300 may be coupled to the lamp housing part 100. The outer lens part 300 may be connected to the lamp housing part 100 while being combined with the vehicle body 2.

The outer lens part 300 is disposed in front of the light path of the light L that is radiated by the projection optical system 200, and covers the reflection part 400.

The outer lens part 300 includes a light-transmissive translucent material. Accordingly, when light is not radiated by the projection optical system 200, the projection optical system 200 and the reflection part 400 are not seen from the outside by the outer lens part 300 made of the translucent material.

The outer lens part 300 includes a first outer lens part 310 that is disposed on one side of the vehicle 1 and a second outer lens part 320 that is disposed on the other side of the vehicle 1. The first outer lens part 310 and the second outer lens part 320 may be symmetrically formed on the basis of the center of the vehicle.

The reflection part 400 is disposed in the light path of the light L that is radiated by the projection optical system 200. The light L that is radiated by the projection optical system 200 is reflected toward the lighting-up surface S of the vehicle by the reflection part 400. Accordingly, an image of the light L that is radiated by the projection optical system 200 can be formed on the lighting-up surface S of the vehicle.

In the present embodiment, the reflection part 400 includes the first reflection part 410 and the second reflection part 420.

The first reflection part 410 is disposed on one side of the vehicle 1, and reflects, toward the lighting-up surface S, the light L that is radiated by the first projection optical system 210.

If the first projection optical system 210 is provided in a plural number in the horizontal direction, the first reflection part 410 may also be provided in a plural number in the horizontal direction, that is, in the width direction of the vehicle 1. Accordingly, pieces of the light L that are radiated by the first projection optical systems 210, respectively, are directed toward the lighting-up surface S while being individually reflected by the corresponding first reflection parts 410.

The second reflection part 420 is disposed on the other side of the vehicle 1, and reflects, toward the lighting-up surface S, the light L that is radiated by the second projection optical system 220.

If the second projection optical system 220 is provided in a plural number in the horizontal direction, the second reflection part 420 may also be provided in a plural number in the horizontal direction, that is, in the width direction of the vehicle 1. Accordingly, pieces of the light L that are radiated by the second projection optical systems 220, respectively, are directed toward the lighting-up surface S while being individually reflected by the corresponding second reflection parts 420.

The lighting-up surface S is disposed under the first reflection part 410 and the second reflection part 420. In the present embodiment, the lighting-up surface S may be a front grill 910 or a front bump 920. That is, the first reflection part 410 and the second reflection part 420 are disposed over the front grill 910 or the front bump 920, and downward reflect the pieces of light L that are radiated by the first projection optical system 210 and the second projection optical system 220, respectively.

Since the pieces of light L that are reflected by the first reflection part 410 and the second reflection part 420, respectively, form an image on the front grill 910, grill lighting can be implemented in the front grill 910.

The grill lighting that is implemented by the lighting apparatus for a vehicle according to an embodiment of the present disclosure may be welcome lighting, goodbye lighting, position lighting, or deco lighting. Furthermore, the grill lighting can implement lighting that displays various types of information, such as an electric charging information display lamp and an autonomous driving information display lamp.

Likewise, bumper lighting can be implemented in the front bump 920 because the pieces of light L that are reflected by the first reflection part 410 and the second reflection part 420, respectively, can form an image on the front bump 920.

The bumper lighting that is implemented by the lighting apparatus for a vehicle according to an embodiment of the present disclosure may be welcome lighting, goodbye lighting, position lighting, or deco lighting. Furthermore, the bumper lighting can implement lighting that displays various types of information, such as an electric charging information display lamp and an autonomous driving information display lamp.

The lighting apparatus for a vehicle according to an embodiment of the present disclosure may be a lamp for a vehicle, including a head lamp, a rear lamp, a tail lamp, a turn signal lamp, a brake lamp, a backup lamp, a daytime running map, and a fog lamp for the vehicle 1. Accordingly, the lamp housing part 100 may be mounted in any one of a head lamp area, a rear lamp area, a tail lamp area, a turn signal lamp area, and a brake lamp area.

If the lighting apparatus for a vehicle forms the head lamp of the vehicle 1, the lamp housing part 100 may be a head lamp housing. If a head lamp module of the vehicle 1 is implemented by using the lighting apparatus for a vehicle according to the present embodiment, the head lamp module may provide a front grill lighting solution and a front bump lighting solution in addition to a head lamp function.

If the lighting apparatus for a vehicle forms the rear lamp of the vehicle 1, the lamp housing part 100 may be a rear lamp housing. If a rear lamp module of the vehicle 1 is implemented by using the lighting apparatus for a vehicle according to the present embodiment, the rear lamp module may provide a rear center lighting solution and a rear bumper lighting solution in addition to a rear lamp function.

Referring to FIGS. 14 to 16, in a modified example of the lighting apparatus for a vehicle according to another embodiment of the present disclosure, the reflection part 400 may be rotatably disposed in the light path of the light L that is radiated by the projection optical system 200.

The light L that is radiated by the projection optical system 200 is reflected toward the lighting-up surface S of the vehicle by the reflection part 400. In this case, as the reflection part 400 is rotated and manipulated, the locations of the lighting-up areas A1 and A2 on the lighting-up surface S of the vehicle 1 can be adjusted.

The reflection part 400 may be rotatably disposed within the outer lens part 300 while being supported by the vehicle body 2 or peripheral parts. Any object that supports the reflection part 400 is not limited if the reflection part 400 can be rotatably disposed within the outer lens part 300 by the object.

In the present embodiment, the reflection part 400 includes the first reflection part 410 and the second reflection part 420.

The first reflection part 410 is disposed on one side of the vehicle 1, and reflects, toward the lighting-up surface S, the light L that is radiated by the first projection optical system 210. Accordingly, the first reflection part 410 implements the first lighting-up area A1 on the lighting-up surface S.

If the first projection optical system 210 is provided in a plural number in the horizontal direction, the first reflection part 410 may also be provided in a plural number in the horizontal direction, that is, in the width direction of the vehicle 1. Accordingly, pieces of the light L that are radiated by the first projection optical systems 210 are directed toward the lighting-up surface S while being individually reflected by the first reflection part 410.

Since the first reflection part 410 is rotatably mounted within the outer lens part 300, the first projection optical system 210 can form an image on the lighting-up surface S along more various light paths through the rotation of the first reflection part 410.

Referring to FIG. 16, the first lighting-up area A1 in which an image is formed as the light paths of the light L that is radiated by the first projection optical system 210 are intersected is formed on the lighting-up surface S. A brighter image is formed in the area in which the light paths are intersected compared to an area in which the light paths are not intersected.

As the first reflection part 410 is rotatably mounted, the area in which the light paths are intersected, that is, an overlap area of the first lighting-up area A1 to which the light L is radiated in the lighting-up surface S, can be further increased or reduced by a rotation operation of the first reflection part 410. Accordingly, various light patterns can be implemented through the lighting apparatus for a vehicle.

The second reflection part 420 is disposed on the other side of the vehicle 1, and reflects, toward the lighting-up surface S, the light L that is radiated by the second projection optical system 220. Accordingly, the second reflection part 420 implements the second lighting-up area A2 on the lighting-up surface S.

If the second projection optical system 220 is provided in a plural number up and down, the second reflection part 420 may also be provided in a plural number up and down, that is, in the height direction of the vehicle 1. Accordingly, pieces of the light L that are radiated by the second projection optical systems 220 are directed toward the lighting-up surface S while being individually reflected by the corresponding second reflection parts 420.

Since the second reflection part 420 is rotatably mounted within the outer lens part 300, the second projection optical system 220 can form an image on the lighting-up surface S along more various light paths through the rotation of the second reflection part 420.

Referring to FIG. 16, the second lighting-up area A2 in which an image is formed as the light paths of the light L that is radiated by the second projection optical system 220 are intersected is formed on the lighting-up surface S. A brighter image is formed in the area in which the light paths are intersected compared to an area in which the light paths are not intersected.

As the second reflection part 420 is rotatably mounted, the area in which light paths are intersected, that is, an overlap area of the second lighting-up area A2 to which the light L is radiated in the lighting-up surface S, can be further increased or reduced by a rotation operation of the second reflection part 420. Accordingly, various light patterns can be implemented through the lighting apparatus for a vehicle.

The lighting-up surface S is disposed under the first reflection part 410 and the second reflection part 420. In the present embodiment, the lighting-up surface S may be the front grill 910 or the front bump 920.

That is, the first reflection part 410 and the second reflection part 420 are disposed over the front grill 910 or the front bump 920, and downward reflects the pieces of light L that are radiated by the first projection optical system 210 and the second projection optical system 220. Accordingly, the first lighting-up area A1 and the second lighting-up area A2 are formed on the lighting-up surface S that is disposed under the first reflection part 410 and the second reflection part 420.

Grill lighting can be implemented in the front grill 910 because the pieces of light L that are reflected by the first reflection part 410 and the second reflection part 420, respectively, form an image on the front grill 910.

The grill lighting that is implemented by the lighting apparatus for a vehicle according to an embodiment of the present disclosure may be welcome lighting, goodbye lighting, position lighting, or deco lighting. Furthermore, the grill lighting can implement lighting that displays various types of information, such as an electric charging information display lamp and an autonomous driving information display lamp.

Likewise, bumper lighting can be implemented in the front bump 920 because the pieces of light L that are reflected by the first reflection part 410 and the second reflection part 420, respectively, can form an image on the front bump 920.

In particular, by rotating and operating the first reflection part 410 and the second reflection part 420, various lighting-up images can be implemented while increasing or reducing the overlap area of the plurality of first lighting-up areas A1 and second lighting-up areas A2.

Accordingly, customizing lighting that is optimized for a use environment or a user can be provided because the lighting-up areas A1 and A2 can be adjusted by only a rotation manipulation of the first reflection part 410 and the second reflection part 420 even without adjusting the locations of the first projection optical system 210 and the second projection optical system 220.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A lighting apparatus for a vehicle, the lighting apparatus comprising:
   a lamp housing part mounted on a vehicle body;
   a projection optical system disposed within the lamp housing part and configured to radiate light in a direction away from the vehicle; and
   a reflection part rotatably disposed in a light path of the light that is radiated by the projection optical system and configured to reflect, toward a lighting-up surface of the vehicle, the light that is radiated by the projection optical system,
   wherein the reflected light travels along a path, a portion of which is outside of the vehicle, toward the lighting-up surface of the vehicle, and
   wherein the lighting apparatus for the vehicle is included in a head lamp for the vehicle.

2. The lighting apparatus of claim 1, wherein the reflection part is configured to perform a rotation operation to adjust a location of a lighting-up area on the lighting-up surface.

3. The lighting apparatus of claim 1, further comprising an outer lens part disposed in front of the light path of the light that is radiated by the projection optical system and configured to cover the reflection part.

4. The lighting apparatus of claim 1, wherein the lighting-up surface is a front grill or a front bump.

5. A lighting apparatus for a vehicle, the lighting apparatus comprising:
   a lamp housing part mounted on a vehicle body;
   a projection optical system disposed within the lamp housing part and configured to radiate light; and
   a reflection part rotatably disposed in a light path of the light that is radiated by the projection optical system and configured to reflect, toward a lighting-up surface of the vehicle, the light that is radiated by the projection optical system,
   wherein:
   the projection optical system comprises a first projection optical system disposed on one side of the vehicle body and a second projection optical system disposed on the other side of the vehicle body,
   the reflection part comprises a first reflection part disposed on the one side of the vehicle body and configured to reflect the light of the first projection optical system so that a plurality of first lighting-up areas are implemented on the lighting-up surface and a second reflection part disposed on the other side of the vehicle body and configured to reflect the light of the second projection optical system so that a plurality of second lighting-up areas are implemented on the lighting-up surface, and
   the lighting-up surface is disposed between the first reflection part and the second reflection part.

6. The lighting apparatus of claim 5, wherein:
   each of the first projection optical system and the second projection optical system is provided in a plural number in a height direction of the vehicle, and
   each of the first reflection part and the second reflection part is provided in a plural number in the height direction of the vehicle.

7. The lighting apparatus of claim 6, wherein:
   the plurality of first lighting-up areas are configured to be overlapped on the lighting-up surface by a rotation manipulation of the first reflection part, and
   the plurality of second lighting-up areas are configured to be overlapped on the lighting-up surface by a rotation manipulation of the second reflection part.

8. The lighting apparatus of claim 5, wherein the reflection part is configured to perform a rotation operation to adjust a location of a lighting-up area on the lighting-up surface.

9. The lighting apparatus of claim 5, further comprising an outer lens part disposed in front of the light path of the light that is radiated by the projection optical system and configured to cover the reflection part.

10. The lighting apparatus of claim 5, wherein the lighting apparatus for the vehicle is included in a head lamp for the vehicle.

11. The lighting apparatus of claim 10, wherein the lighting-up surface is a front grill or a front bump.

12. A lighting apparatus for a vehicle, the lighting apparatus comprising:
   a lamp housing part mounted on a vehicle body;
   a projection optical system disposed within the lamp housing part and configured to radiate light; and
   a reflection part rotatably disposed in a light path of the light that is radiated by the projection optical system and configured to reflect, toward a lighting-up surface of the vehicle, the light that is radiated by the projection optical system,
   wherein:
   the projection optical system comprises a first projection optical system disposed on one side of the vehicle body and a second projection optical system disposed on the other side of the vehicle body,
   the reflection part comprises a first reflection part disposed on the one side of the vehicle body and configured to reflect the light of the first projection optical system so that a first lighting-up area is implemented on the lighting-up surface and a second reflection part disposed on the other side of the vehicle body and configured to reflect the light of the second projection optical system so that a second lighting-up area is implemented on the lighting-up surface, and
   the first lighting-up area is disposed under the first reflection part, and the second lighting-up area is disposed under the second reflection part.

13. The lighting apparatus of claim 12, wherein:
   each of the first projection optical system and the second projection optical system is provided in a plural number in a horizontal direction of the vehicle, and
   each of the first reflection part and the second reflection part is provided in a plural number in the horizontal direction.

14. The lighting apparatus of claim 13, wherein:
   the plurality of first lighting-up areas are configured to be overlapped on the lighting-up surface by a rotation manipulation of the first reflection part, and
   the plurality of second lighting-up areas are configured to be overlapped on the lighting-up surface by a rotation manipulation of the second reflection part.

15. The lighting apparatus of claim 12, wherein the reflection part is configured to perform a rotation operation to adjust a location of a lighting-up area on the lighting-up surface.

16. The lighting apparatus of claim 12, further comprising an outer lens part disposed in front of the light path of the light that is radiated by the projection optical system and configured to cover the reflection part.

17. The lighting apparatus of claim 12, wherein the lighting apparatus for the vehicle is included in a head lamp for the vehicle.

18. The lighting apparatus of claim 17, wherein the lighting-up surface is a front grill or a front bump.

* * * * *